Nov. 10, 1942.   C. I. BRADFORD   2,301,195
MEASURING INSTRUMENT
Filed Aug. 30, 1941   2 Sheets-Sheet 1

INVENTOR
COLIN IRVING BRADFORD
BY
ATTORNEYS

Patented Nov. 10, 1942

2,301,195

UNITED STATES PATENT OFFICE 2,301,195

MEASURING INSTRUMENT

Colin Irving Bradford, Fairfield, Conn., assignor to Remington Arms Company, Inc., a corporation of Delaware Application August 30, 1941, Serial No. 408,969

12 Claims. (Cl. 161—15)

This invention relates to an interval measuring apparatus for measuring time intervals, utilizing a charge on a condenser directly and accurately proportional to the time being measured and particularly times of extremely short duration. Accurate measurement of short time intervals is needed in many precision devices, and as an example thereof a device for measurement of the flight of a projectile through a barrel or external of the barrel may be cited. Accurate measurements of time intervals are also desired in other instruments, such as depth sounding instruments, instruments for measuring the time of operation of relays, circuit breakers, sound locators, and many other operations involving short time intervals from which an electrical impulse can be obtained at the beginning and end of the interval. It is possible to use the quantity of electricity accumulated on a condenser during the interval to give a measurement of the interval. In order to obtain satisfactory results, it is necessary that the charging rate of the condenser be directly proportional to time, and the present invention has as one of its objects an instrument which will so operate. The basic requirements of a time interval measuring instrument are accuracy, ease of operation, portability, direct reading with a linear scale, and other related matters. For velocities over short ranges and for barrel time with times between .002 and .040 second, the conventional Boulenge Chronograph is not satisfactory. One of the objects of this invention is to provide an accurate instrument for such measurement of short time intervals which will have the desired characteristics. Another object is to provide an indicating device which may be readily calibrated and adjusted to give the required readings and to give a reading which lasts for a sufficient length of time to meet the requirements.

The invention contained herein constitutes an improvement over that disclosed in applications S. N. 276,167 and S. N. 334,300. It is to be understood that the device is capable of being used for any purpose wherein an electrical impulse may be obtained at the beginning and end of an interval, and is not limited to ballistic measurements. From the following illustrative description in which are disclosed certain embodiments of the invention as well as means and details of carrying it out, it will become apparent how the foregoing and other objects may be accomplished.

In the drawings:

Fig. 7 is a circuit diagram of a further modification which may be used, which is generally similar to Fig. 6.

The switching circuit for the chronoscope disclosed herein, which is responsive to an impulse at the beginning of the interval and at the end of the interval, serves to provide a flow of current during the interval to be measured. A flow of current is used to charge a condenser, and then the charge on the condenser may be measured by suitable means. The switching circuit may consist of two gaseous discharge tubes of well-known types, which are normally non-conducting. A suitable impulse is used to change the potential of the control electrode of the first tube, which causes this tube to become conducting. An impulse at the end of the interval to be measured is placed upon the control grid of the second tube, causing it to become conducting. The plates or anodes of these two tubes are connected together, as are also the cathodes, and there is a common connection between the anode connection just referred to and the cathode connection. A source of energy and a resistance are located in said common connection. Various means may be employed in conjunction with the rendering of the second tube conducting to depress the anode potential of the first tube so as to stop conduction therethrough at the end of the interval. The measuring or indicating circuit is so associated with the switching circuit as to become effective during the time the first tube is conducting to give a measurement of such time. One method of obtaining the drop of potential required for extinguishing the first tube is described in application S. N. 334,300, which employs a battery or a source of energy in the anode circuit of the second tube. The additional flow of current through the resistance in the common connection will cause a lowering of anode potential, as will be described at a later point, so as to stop conduction in the first tube. Another method that may be employed is the use of a condenser in the second tube circuit which will discharge through the common resistance when the second tube becomes conducting, thereby driving the first tube anode potential to an extinction value. Still another method which may be used to extinguish the first tube is by the use of a resistance of sufficient value in the cathode circuit of the first tube, such as described in S. N. 408,970. Several of these various types of switching circuits will be shown in the description hereafter.

Figure 1:
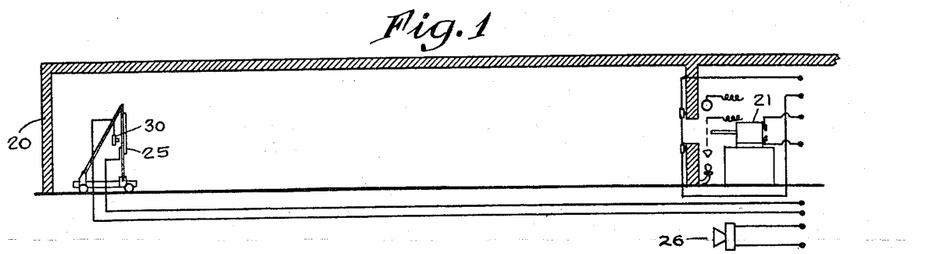
Fig. 1 is a schematic drawing of a ballistic range which shows several devices for indicating the time at which a projectile arrives at a particular point of its flight.

Referring now to Fig. 1, there is shown merely by way of example one manner of using the invention, wherein 20 indicates the walls and roof of a ballistic range. In the firing chamber there may be located a breech mechanism 21 which may be fastened in any suitable manner, and at the other end of the range there is located a target plate 25 against which a projectile fired from the barrel may be directed. There may be a disjunctor contact 30 of conventional design located back of the target plate. There may also be provided some suitable means at the muzzle of the gun, or responsive to the fall of the hammer upon the primer of the projectile, to provide a suitable impulse to indicate the starting of the projectile in its flight. A microphone, as shown at 26, also may be used to provide an impulse if desired, or any equivalent device. The bullet striking target plate 25 will cause the contact 30 mounted thereon to be moved away from the plate 25, thus breaking the contact and causing an impulse. The details of the ballistic range are well-known and are not a part of this invention. It is evident that many various forms and devices may be used to provide the impulses to indicate the beginning and end of the interval to be measured. Such impulses may cause the making or the breaking of a circuit to affect the control grid of the first tube.

In the present invention, the flow of current in the main switching circuit during the time interval to be measured is employed to cause the flow in another circuit in which a condenser is located. The switching means for this last mentioned circuit may be a vacuum tube wherein the control element thereof is connected to the main switching circuit. The condenser may then be located in the plate-cathode circuit of this last mentioned tube.

The fundamental relation to charge a condenser of capacity C is $$CV = \int_0^t i \, dt;$$

then if I is constant during the interval T, $V = (I/C)T$ so that therefore the voltage V appearing on the condenser will be a linear function of time. There has been difficulty hitherto in obtaining a constant current closer than a few percent with the result that the voltage against time scale was not linear, or if it was made linear the accuracy of the method was very limited. Another way to view this matter is that the condenser voltage building up as the condenser is being charged is in a direction to oppose the battery or source of energy charging the condenser. Therefore, as the condenser becomes charged, the voltage impressed upon the plate of the tube will be lowered, which will mean that the current cannot be held constant during the charging of the condenser without special means for so doing. By the method described herein, the current through the condenser can be maintained constant during the charging thereof, and this is accomplished in a very simple manner by placing a resistance in the cathode circuit of the condenser charging tube.

Figure 2:
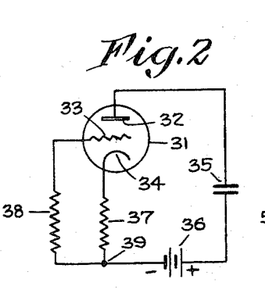
Fig. 2 is a simplified circuit arrangement of a portion of the main circuit, showing the fundamental circuit.

Referring now particularly to Fig. 2, a tube 31 has anode or plate 32, control grid 33 and cathode 34. It is to be understood that in this application wherever the word "plate" or "grid" is used that this may also mean "anode" or "control element" respectively or vice versa. The condenser to be charged is shown at 35, and the charging battery at 36. The compensating resistance is shown at 37, and the usual grid resistance at 38. Assuming that conduction has been started in the circuit from the plus side of battery 36 through condenser 35, plate 32, cathode 34, compensating resistance 37 to the negative side of battery 36, then the potential at point 39 of resistance 37 will be impressed upon control grid 33 through resistance 38. If for any reason the current increases in this circuit, a drop in potential will result at point 39 due to the increased flow through resistance 37, which will lower the potential applied on grid 33. This will tend to cause a decrease in the conduction therethrough which will offset the previous increase in flow of current. Similarly, if the flow in the main circuit should decrease, there will be less current flowing through resistance 37, with the result that the potential at point 39 will be raised, causing the control element 33 to have its potential raised, thereby increasing the flow of current through tube 31 and counteracting the decrease. The value of the resistance 37 and the constants of the circuit can be easily determined so as to produce an exact compensation for changes in current flow. In this manner, as condenser 35 starts to charge and approaches its charged condition, the resulting decrease in potential applied to tube 31 with a resultant decrease in current will cause a raising of the potential at point 39 so that control element 33 of tube 31 will increase the flow of current and thus counteract the decrease in flow as the condenser 35 accumulates its charge. Thus, it can be seen that the current will be maintained constant during the charging of the condenser.

Figure 3:
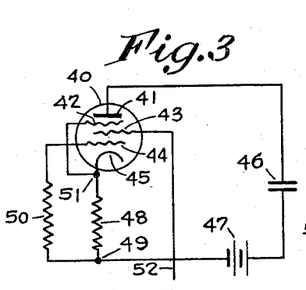
Fig. 3 is a simplified circuit arrangement showing a different type of electronic tube than that shown in Fig. 2.

Referring now to Fig. 3, the triode 31 of Fig. 2 is replaced by a pentode 40 having a plate 41, suppressor grid 42, screen grid 43, control grid 44 and cathode 45. It is to be understood that various kinds of tubes may be used, and are not limited to those shown. It is also to be understood that the cathode may be either of the directly or indirectly heated type. The circuit of Fig. 3 operates similar to Fig. 2 wherein condenser 46 is charged by battery 47 as tube 40 becomes conducting. With a decrease in the flow of current through resistance 48 as the condenser accumulates its charge, point 49 will have its potential raised so that control element 44 through resistance 50 will also have its potential raised, causing an increase in the circuit passing through the tube to counteract the effect of the build-up of the charge on condenser 46. Suppressor grid 42 may be connected at 51 to the cathode 45. The screen grid 43 may be connected through lead 52 to a suitable source of potential for the purpose of controlling the characteristics such as the current flow in tube 40.

Figure 4:
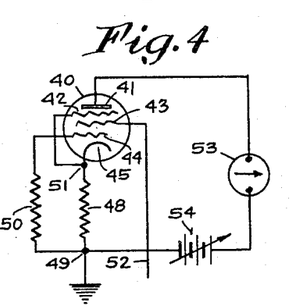
Fig. 4 is a simplified circuit arrangement similar to Fig. 3 with the condenser replaced by a meter, so that the characteristics of the circuit may be determined.

The circuit of Fig. 4 is identical to Fig. 3 with the exception that a meter 53 is substituted for the condenser 46 and battery 54 may be varied. The other parts of the circuit are given the same numbers as the parts shown in Fig. 3. By the use of the circuit in Fig. 4 and the taking of readings of current by meter 53 when varying the voltage applied to the circuit by variable battery 54, the constancy of plate current of tube 40 may be determined. It has been found that the current could be held constant to within plus or minus 0.2% over the necessary working range of the condenser voltage that would be used. As an example, when using a 6S J7 tube, a supply of voltage of 300 volts to the condenser, a condenser working range of 50 volts, a compensating resistance of 15000 ohms can be used and the constancy be held within plus or minus 0.2%.

In Fig. 2 there is shown one form of complete chronoscope circuit using a battery extinguishing means for the first tube, such as disclosed generally in S. N. 334,300. The initial impulse is placed across terminals 55, which will drive grid 56 of tube 57 in the positive direction, this grid being biased negatively by battery 58 through resistance 59. This will start a current flowing in the anode-cathode circuit of tube 57 from battery 60, resistance 61, anode 62, cathode 63, point 64, resistance 65, line 66 to the negative side of battery 60. The tube 57 is of the "Tyratron" or gaseous discharge type wherein the grid serves merely to start conduction in the tube. A certain minimum voltage must be available on anode 62 for potential drop in the tube for the tube to remain conducting, and if this is reduced below said voltage, the tube will become non-conducting. For the conventional type of gaseous filled tube, the required voltage is about 15 volts. This voltage must be maintained until an impulse at the end of the interval is placed across terminals 67 of the second gaseous discharge tube 68 upon the grid 69 thereof, which may be similarly biased negatively. Tubes 57 and 68 are biased so as to be normally non-conducting. The anode 70 of tube 68 is connected to an extinguishing battery 71 which is in the common connection 72, 73 between the anodes 62 and 70 of tubes 57 and 68 respectively. When the flow is started in the anode circuit of tube 57, a potential drop will occur across resistance 61 but anode 62 will still be above the extinction value for tube 57, the resistance 61 and circuit constants being appropriately selected. When tube 68 becomes conducting, current will flow from battery 71, anode 70, cathode 74, line 75, line 76, battery 60, resistance 61, back to the negative side of battery 71. It is seen therefore that an additional potential drop will take place across resistance 61, and this is made such that the anode potential at 62 will be reduced below the conducting value for tube 57 so that tube 57 will be extinguished. It is seen therefore that there will be a flow through the anode-cathode circuit of tube 57 from the beginning of the interval when 57 becomes conducting, to the end of the interval or when 68 becomes conducting. As will be explained, other means than the battery 71 may be employed to extinguish tube 57. In order to read the time during which this current flow takes place, tube 77 is provided, which may be of the tetrode type or any other suitable tube that is desired. The control element or grid 78 thereof is connected to point 64 in the cathode circuit of tube 57 by lead 79 through negative biasing battery 80 and resistance 81. The battery 80 will normally hold tube 77 non-conducting, tube 77 being of the high vacuum type and normally non-conducting. When the grid 78 becomes sufficiently positive, tube 77 becomes conducting with the result that current will flow from a positive terminal 89, lead 90, potentiometer 91, which may be set at zero, lead 92, through battery 82 through ammeter 83, condenser 84, anode 85, cathode 86, compensating resistance 87, back to ground at 88. The condenser charging current and resulting time range of the instrument may be adjusted by means of the screen grid 93 of tube 77, whose potential is regulated by means of potentiometer 94. The charge on condenser 84 may then be read by means of the electron tube voltmeter shown generally at 95, consisting of a Wheatstone bridge circuit with an inverted vacuum tube 96 in one leg of the bridge. Resistances 97, 98 and 99 are in the other three legs of the bridge, with indicating meter 100 serving to show the state of balance in the bridge. Power for the bridge is supplied across terminals 101. As stated, tube 96 is operated in an inverted manner or wherein the conventional anode 102 is used as a control element and the conventional grid 103 is used as the anode. Cathode 104 performs its usual function. The main flow of electrons therefore in the tube is between the element 103 and element 104 so that the leakage within the tube is reduced to a minimum. This type of tube is more fully described in application S. N. 408,968. It is necessary in order to accurately read the instrument that the leakage from the condenser be kept at an absolute minimum; and by the use of vacuum tube 96 in an inverted manner, the leakage is kept at a minimum. Substantially no current is drawn from the condenser by the voltmeter. Another advantage of this type of tube is that the tube 104 is so biased as to be normally conducting so that as the charge is placed on condenser 84, the condenser plate connected to the control element of tube 96 will become more negative, thereby reducing the current flow through 96 and resulting in an unbalance in the bridge and meter 100. In this manner, there is no danger of a sudden overload on tube 96 because it is already operating to carry as much current as it will be called upon to do. It may be seen that compensating resistance 87 performs the same function as does resistance 48 of Figs. 3 and 4. An increase of current flow through resistance 87 will result in a lowering of the potential at 105, which will appear on grid 78 through line 76, line 66, resistance 65, point 64, line 79, battery 80, resistance 81, thereby decreasing and counteracting the increase of flow through tube 77. Similarly, when the flow decreases, as will occur as the charge builds up on the condenser, point 105 will be raised in potential, which will raise the potential of grid 178 and cause a compensating increase in flow through tube 77. In this manner, the current flow through condenser 84 can be maintained at a constant value in spite of the effect of the increase of potential or condenser 84 as it becomes charged. The current flow through the condenser may be adjusted by means of the potentiometer 94. The battery 82 will serve to supply the necessary negative bias on control element 102 of tube 96. When it is desired to set the current to a known steady state value, the switch 106 may be closed and the slider on variable resistance 91 moved to a point so that the resulting voltage on the plate of tube 77 will be in the middle of its operating range. Conduction may then be initiated in tube 57 and the current through 77 read on meter 83 and adjusted by varying the screen grid voltage 93 by variable resistance 94. The vacuum tube voltmeter may be calibrated by altering the slider on potentiometer 91 and taking simultaneous reading of the voltmeter 107 and the indicating meter 100. The battery 290 furnishes the potential for such a calibration. It is to be understood, of course, that, if desired, other types of meters may be used to read the charge on condenser 84. It is also apparent that suitable scales or calibration curves could be used if desired.

Figure 5:
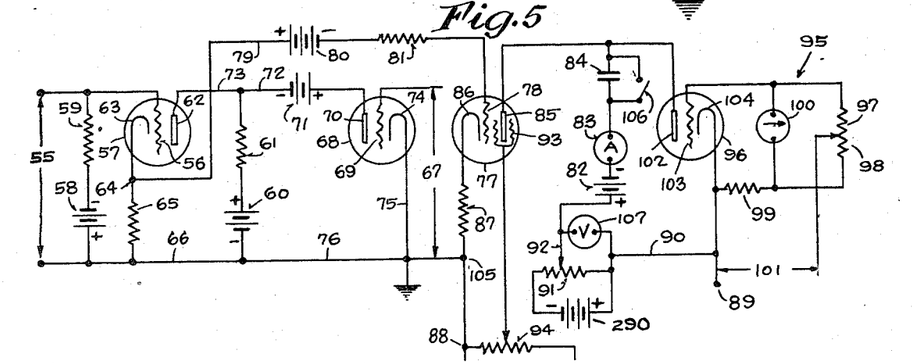
Fig. 5 is a circuit diagram of one form of the device which may be used.

In Fig. 5 when tube 68 becomes conducting and extinguishes tube 57, it will be evident that the current from battery 71 will continue flowing through resistance 61 so that the device must be re-set so as to read another interval. This serves to lock out the device so that after the first impulse is received on tube 57 and the tube has been extinguished by 68, another impulse appearing on 55 will not serve to cause another reading of the device. This is because tube 68 remains conducting until it is extinguished. An additional impulse might be produced by chattering of the contacts, for example.

Summarizing the operation of the circuit of Fig. 5, an impulse at the beginning of the interval impressed across terminals 55 and on grid 56 of tube 57 will render this tube conducting and current will flow through the anode circuit thereof. This will cause a raising of the potential at 64 which will raise the potential of grid 78 of tube 77 and cause the latter tube to become conducting. Current will flow through the anode-cathode circuit thereof and charge condenser 84. This circuit includes the compensating resistance 87 so that the potential at point 105 will be in accordance with the flow through the anode circuit and will be reflected upon the grid 78 so as to maintain the current constant through condenser 84. Then at the end of the interval, tube 68 will break down and the anode current thereof will pass through resistance 61 and reduce the anode potential on tube 57 so as to cause it to become non-conducting again. Thus, condenser 84 will be charged at constant current during the interval which is to be measured, and the vacuum tube voltmeter circuit will read the charge on condenser 84 which will be directly proportional to the time interval.

Figure 6:
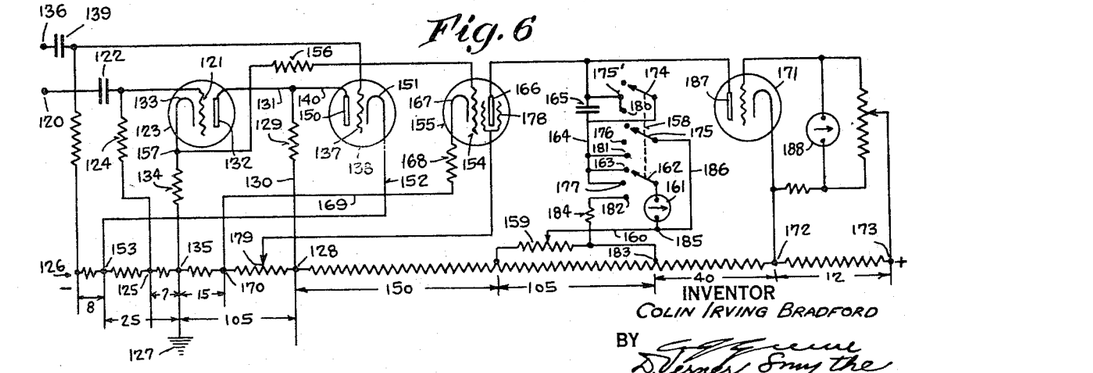
Fig. 6 is a circuit diagram of another form of the device wherein a power supply is provided in place of the batteries of Fig. 5.

Referring now to Fig. 6, the circuit is shown wherein the battery power supply has suitable resistances substituted therefor to give the desired potentials. The impulse at the beginning of the interval is placed on terminal 120 which is impressed upon control grid 121 of the normally non-conducting gaseous discharge tube 123 through the condenser 122. A negative grid bias is placed on grid 121 through resistance 124 from point 125 of the voltage divider, shown generally at 126. The voltage divider is grounded at 127, so that there will be a negative bias relative to ground on grid 121. The potential is applied between points 173 and 126, the latter being negative. The conduction starting in tube 123 causes a current to flow from point 128 from the common connection 130, through resistance 129, line 131, anode 132, cathode 133, resistance 134 back to ground at 135. At the end of the interval to be measured, an impulse is placed on terminal 136, which appears on grid 137 of normally non-conducting gaseous discharge tube 138 through condenser 139. This starts conduction in the anode circuit of tube 138 from point 128, common connection 130, resistance 129, lead 140, anode 150, cathode 151, lead 152 to point 153 through the voltage divider so that an additional current flows through resistance 129 due to the conduction of tube 138 which lowers the potential on plate 132 sufficiently so as to extinguish tube 123. The control grid 154 of tube 155 has a positive potential impressed thereon through resistance 156, from point 157, when tube 123 becomes conducting. This causes tube 155 to become conducting so that when the switch operator 158 (shown schematically) is in the upper or measuring position, current will flow from potentiometer 159 (may be zero), lead 160, meter 161, switch blade 162, contact 163, lead 164, condenser 165, anode 166, cathode 167, compensating resistance 168, lead 169 to point 170 on the voltage divider. Changes of potential on point 170 due to increase or decrease of flow through compensating resistance 168 will be reflected back on grid 154 through point 135, resistance 134, resistance 156 and will compensate for any changes in current flow through condenser 165 to maintain the same constant as previously described. Tube 171 may be an inverted voltmeter tube similar to tube 96 of Fig. 5. The remainder of the electronic voltmeter may be the same as 95 of Fig. 5, and it is not deemed necessary to further describe it in detail at this point. The electronic tube voltmeter obtains its power supply across points 172 and 173 in a conventional manner. When it is desired to re-set the instrument, it is necessary to remove the charge from condenser 165, which may be done by placing switch operator 158 in the middle position or with switch blade 174 on contact 175′ so that a short circuit will be placed across condenser 165. In this position, blade 175 will still be open on contact 176, blade 162 will be on contact 177, and condenser 165 will be shorted so that it will be possible to set the current, which will flow from resistance 159 through lead 160, meter 161, switch blade 162, contact 177, lead 164, through the plate circuit of tube 155. It is understood, of course, that in order to set the current it is necessary to trip the first tube 123 and start conduction in tube 155. In a manner similar to that for Fig. 5, the desired voltage can be set by means of the potentiometer 179, and then the screen grid 178 may have its voltage adjusted by means of the variable contact 179 so as to set the current to that desired. When it is desired to calibrate the electronic tube voltmeter 171, the switch operator 158 is moved to its lower position so that blade 174 is on contact 180, thus short circuiting condenser 165; blade 175 is on contact 181; and blade 162 is on contact 182. It may then be seen that a source of variable potential is impressed upon voltmeter 161 from point 183, resistance 184, contact 182, blade 162, meter 161, back to potentiometer 159. Point 185 of the meter is connected to the electron voltmeter through lead 186, switch blade 175, contact 181, lead 164, through the condenser short circuit switch to control element 187 of tube 171. In this manner, the voltage impressed upon tube 171 may be varied by potentiometer 159 and the value thereof read on voltmeter 161 and simultaneously on indicating meter 188. It is to be understood that the voltages in voltage divider may be kept constant by means of gas filled regulator tubes, as will be described for Fig. 7. In view of the explanation of the operation of Fig. 5, it is not believed necessary to summarize the operation of Fig. 6.

Fig. 7 shows another modification of the circuit generally similar to Fig. 6 with the exception of some of the details. An impulse may be placed across terminals 200 at the beginning of the interval, which will appear on control grid 201 of the normally non-conducting gaseous discharge tube 202. Condenser 203, resistances 204 and 205 are conventional. When tube 202 becomes conducting, a plate current is drawn from point 206 of the voltage divider 208′. The source of potential may be placed across points 278 and 279, the latter being the negative point. The circuit is from point 206, lead 207, switch blade 208, lead 209, common resistance 210, lead 211, resistance 212, plate 213, cathode 214, extinguishing resistance 215, common cathode connection 216, back to ground at 217. The switch may be of a four-gang type switch with a switch operator 219 indicated schematically. This is shown in the measuring or central position so that switch blade 208 is connected to contact 226. The impulse at the end of the interval may be placed across terminals 220 which will appear upon control grid 221 of the normally non-conducting gaseous discharge tube 222 through the conventional condenser 223. Resistances 224 and 255 are similar to resistances 204 and 205 of the circuit of tube 202. When tube 222 breaks down and becomes conducting, a current is established through the plate circuit thereof from point 206, line 207, switch blade 208, contact 226, lead 209, resistance 210, central point 227, lead 228, plate 229, cathode 230, line 217 to ground at 231. In the modification shown in Fig. 7, the extinguishment of tube 202 is accomplished because of the presence of the extinguishing resistance 215 which is described in detail in applicant's co-pending application, S. N. 408,970. The potential drop between the anode 213 of tube 202 and ground 231 will be the drop within the tube between the plate and anode plus the drop within the tube between the plate and anode plus the drop in resistance 215. The drop between the anode of tube 222 and ground will be only the drop within the tube inasmuch as these tubes must be at the same potential when they both are conducting. Tube 202 will extinguish because no current can appear across extinguishing resistance 215. The flow of current through the switching circuit is impressed upon tube 232 from point 233, line 234 to control element 235 of tube 232. For the purpose of illustration, tube 232 is indicated as being of the pentode type, although it is to be understood that various suitable tubes may be used. The control grid 235 of tube 232 may be connected by lead 236 to the suppressor grids 237. Control grid 235 normally has a negative bias thereon to render the tube non-conducting, and when the positive potential is placed on 235 the tube will become conducting and there will be a current flow through the plate circuit thereof from variable contact 238, line 239, one of the resistances of 240, variable contact 241, condenser 242, lead 243, plate 244, cathode 245, variable contact 246, one of the compensating resistances of 247, variable adjusting resistance 248, lead 249, point 250. The resistance 248 in combination with resistance 247 may be used to adjust the flow of current through the anode circuit of tube 232, although it is to be understood that other means may be employed, such as an adjustment of the screen grid. The potential for the condenser charging circuit thus will be between points 250 and 238, 238 being the positive end. Variable switch blades 241 and 246 may be connected together so that any one of the five different resistances of 247 may be selected to give the proper current flow through the plate circuit for varying desired values of time intervals to be read. With the changing of the current passing through condenser 242, it is also necessary to change the compensating resistances accordingly so that the appropriate resistance of 247 together with the resistance of 240 is selected when the switch operator 251 is operated, the operator 251 being shown schematically. The voltage appearing on condenser 242 is impressed upon the control electrode 253 of the inverted electronic voltmeter tube 252 in a manner similar to that described for Fig. 6. The source of energy for the electron tube voltmeter is across terminals 254 and 255 through points 256 and 257 respectively. A meter 258 is shown in the electron tube voltmeter with a jack 259 so arranged with appropriate resistances that a permanent recorder or other indicating instrument may be connected in the meter connection of the electronic tube voltmeter. Variable resistance 287 serves to adjust the sensitivity of meter 258. When it is desired to re-set the instrument for another reading, the switch operator 219 is placed in its upper or re-setting position, which will carry switch blade 260 so that it contacts 261 and places a short around condenser 242. When the switch is in this position, the voltmeter 258 may also be calibrated. In the upper position of switch 218, blade 262 is connected to contact 263, and blade 264 is connected to contact 265. The connection is then from point 266, line 267, resistance 268, contact 265, blade 264, meter 269, blade 262, contact 263, line 264, line 239, back to point 238. Control element 253 of tube 252 is connected through the condenser short circuit of switch blade 260, contact 241, one of the resistances of 240, to point 238, and the variable contact 238 may then be changed and simultaneous readings taken on meter 269 and meter 258 so as to calibrate the electronic tube voltmeter. When it is desired to set the current in the plate circuit of tube 232, switch operator 219 is moved to its lower position. Switch blade 260 will be connected to contact 270 and will short circuit condenser 242. Switch blade 262 will remain connected to contact 271, and switch blade 264 will remain connected to contact 272. Switch blade 208 will be connected to 226. With the switch in this position, the current will flow from point 238, which may be at zero, or point 266, line 239, one of the resistances of 240, variable contact 241, through the short circuiting switch and condenser 242 to tube 232. Parallel with this circuit will be meter 269 through line 264, line 273, contact 272, switch blade 264, meter 269, blade 262, contact 271, resistance 274, back to line 275. In this manner, the meter 269 will read the current passing through the plate circuit of tube 232. After having adjusted the tube to operate at the desired current, by adjusting variable resistance 248 and resistance 247, the rough adjustment to agree with the resistance of 240 is selected by variable contact 246. It is to be noted that meter 269 is in the same circuit when the instrument is measuring.

The source of supply for the device may be from a suitable power pack, such as a full wave rectifier or other type of rectifier having a positive connection at 278 and the negative terminal 279. It may also be from a battery. In order to maintain the voltage constant in the circuit, voltage regulator tubes of conventional gaseous discharge type may be provided at 280, 281 and 282 with a suitable resistance 283 to cause these types to function as voltage regulators in a conventional manner. A gaseous discharge tube such as a quarter watt neon tube may be provided at 285 to give an indication when tube 222 is conducting so that the instrument may be re-set before a reading is taken. Tube 285 is connected across the anode 229 of tube 222 and the point 286. Point 286 is between common resistance 210 and the source of energy. If tube 222 breaks down and becomes conducting, the voltage drop of point 286 to anode 229 will be that across 210, and this is made such that the voltage will be high enough to break down tube 285 when tube 222 is conducting. This will give an indication, therefore, that the instrument must be re-set. The arrangement will not break down however until the desired time while the switching operations are taking place. Summarizing the operation of this circuit, an impulse placed on terminals 200 will cause tube 202 to break down and the flow through the plate circuit thereof will cause a positive potential to be placed on grid 235, resulting in tube 232 becoming conducting. The flow in the plate circuit 232 will charge condenser 242 and will also flow through the compensating resistance 247. The compensating resistance 247 will maintain a flow of constant current through condenser 242 through the action of compensating resistance 247 on grid 235. When the second impulse is received on terminals 220, tube 222 will become conducting and because of the extinguishing resistance 215, tube 202 will be extinguished, thereby stopping the flow through tube 232 and condenser 242. Tube 285 will then break down and indicate the conductivity of tube 222. The electron tube voltmeter will then indicate the charge which has been placed on condenser 242. This will be directly proportional and bear a linear relation to the time tube 202 was conducting during the interval being measured. It is to be noted that in the voltage calibrating and reset, when the switch operator 219 is in its upper position, switch blades 208 and contact 226 are broken so as to shut off the tube 222.

The circuit of Fig. 7, because of the presence of the extinguishing resistance and conduction of tube 222 on receipt of the second impulse, will lock out so that when tube 202 has been extinguished further impulses appearing at terminals 200 will not serve to cause the device to repeat the switching operation with its consequent double reading on the meter or damage to the meter and circuits.

It is desirable that the measuring condenser 35, for example, of Fig. 2 or its counterpart in the other circuits, have certain characteristics which should be strictly adhered to in order to obtain accurate results from the device. When a condenser is charged, there is a certain absorption in the dielectric, and this must be kept at a minimum or within such a range as not to affect the accuracy of the final reading. There may be various theories evolved concerning the exact reason for the absorption which occurs in the dielectric of a condenser, but the exact explanation is not known. The effect of such absorption is that the voltage available on the condenser for measurement will be less than that due to the charge thereon, because of the voltage loss due to absorption. It is obvious from this that the absorption must be kept at a minimum. It is believed that the dielectric absorption is due to an intermolecular action of some kind within the dielectric, although this is not definitely known. Inasmuch as the voltage on the condenser is determined by means of the vacuum tube voltmeter circuit and must be linear to give the correct reading of the time interval involved, it is evident that any difference between this voltage and the voltage due to the charge thereon will seriously affect the accuracy. Certain dielectrics have been found to be particularly good, and among these may be mentioned mica, polystyrene and quartz. It is to be pointed out that the mica must be carefully selected to be satisfactory. The measurement of absorption is difficult, due to the small quantities involved, but these quantities are sufficient to make the instrument inaccurate and prevent a linearity of the scale employed. One way of expressing the value of the absorption may be by an absorption factor "$k$", which may be defined as $$k = \frac{\frac{Q}{C} - V_c}{\frac{Q}{C}}$$

wherein $k$ is the absorption factor, $Q$ the quantity of charge, $C$ the capacity of the condenser and $V_c$ the voltage appearing on the plates of the condenser after it has been charged, assuming that there is no external leakage. It has been found that this voltage must be at least 99% of that impressed thereon in order to obtain accurate readings, so the absorption factor should not be greater than 1% in order to give the desired results. It will, of course, be understood that if such an accurate reading is not required, a dielectric or condenser having a larger absorption factor may be employed.

There are other ways of determining the absorption factor or an equivalent thereof, such as by impressing an alternating current of varying frequency on the condenser and noting the change in the loss factor as the frequency changes. With higher frequency, a large absorption will result in a decreasing capacity of the condenser. If there were no absorption, the capacity would be the same at all frequencies, neglecting other factors. At the higher frequency, the time during which the voltage is applied to the condenser decreases so that a higher absorption results in a lower capacity. It has been found that this difference in capacity between 10 kilocycles and 10 cycles should not be much over 0.1%.

By the present invention, a method and apparatus are provided for determining an interval between two impulses, which is particularly adaptable to production testing of ammunition or of other devices, providing easy operation, calibration and accuracy. By the present method and apparatus, an extremely accurate method of measuring and indicating time intervals of very short or of long duration is provided.

The invention is not to be construed as limited to the devices illustrated, but is to be extended to all equivalent devices and methods coming within the scope of the appended claims.

What is claimed is:

1. In an interval measuring device, a circuit responsive to a change in condition at the beginning and end of the interval to be measured; a condenser and electronic tube circuit connected to said circuit, said tube being rendered conducting during the interval to be measured, said condenser receiving charge when the tube is conducting; means in the cathode circuit of said tube to maintain constant current flow through the tube and condenser while the tube is conducting; and means to measure the charge on the condenser.

2. In an interval measuring device, a circuit responsive to a change in condition at the beginning and end of the interval to be measured; a condenser and electronic tube in said circuit, said tube being rendered conducting during the interval to be measured, said condenser receiving charge when the tube is conducting; a degenerative feed back circuit connected to said circuit to maintain constant current flow through the tube and condenser while the tube is conducting; and means to measure the charge on the condenser.

3. In an interval measuring device, a circuit responsive to a change in condition at the beginning and end of the interval to be measured; a condenser and electronic tube in said circuit, said tube being rendered conducting during the interval to be measured, said condenser receiving charge when the tube is conducting; a resistance in the cathode circuit of said tube; a connection from said resistance to at least one control element of the tube so that an increase in flow of current through the resistance will increase the negative potential on the control element, thereby decreasing said flow of current to maintain constant current through said cathode and condenser while the tube is conducting; and means to measure the charge on the condenser.

4. In an interval measuring device, two normally non-conducting gaseous tubes having their anodes connected together, a source of energy in said connection, one of said tubes being rendered conducting at the beginning of the interval to be measured and the other of the tubes being rendered conducting at the end of the interval, thereby allowing the source of energy to cause a flow through the second tube and depress the plate potential of the first tube to make the first tube again non-conducting; a third electronic tube with a condenser in the anode-cathode circuit thereof, said third tube being connected to said first tube so that it becomes conducting therewith, and charging said condenser during the interval; and means connected to said third tube to maintain constant current in the anode-cathode circuit thereof.

5. In an interval measuring device, two normally non-conducting gaseous tubes having their anodes connected together, a source of energy in said connection, one of said tubes being rendered conducting at the beginning of the interval to be measured and the other of the tubes being rendered conducting at the end of the interval, thereby allowing a flow from the source of energy to pass through the second tube and depress the plate potential of the first tube to make the first tube again non-conducting; a third electronic tube with a condenser in the anode-cathode circuit thereof, said third tube being connected to said first tube so that it becomes conducting therewith, and charging said condenser during the interval; means connected to said third tube to maintain constant current in the anode-cathode circuit thereof; and means to measure the charge on the condenser.

6. In an interval measuring device, two normally non-conducting gaseous tubes having their anodes connected together, a source of energy in said connection, one of said tubes being rendered conducting at the beginning of the interval to be measured and the other of the tubes being rendered conducting at the end of the interval, thereby allowing a flow from the source of energy to pass through the second tube and depress the plate potential of the first tube to make the first tube again non-conducting; a third electronic tube with a condenser in the anode-cathode circuit thereof, said third tube being connected to said first tube so that it becomes conducting therewith, and charging said condenser during the interval; means connected to said third tube to maintain constant current in the anode-cathode circuit thereof; and a fourth electronic tube having its control element associated with said condenser, said fourth tube operating in an electron tube voltmeter circuit, thereby measuring the charge on the condenser.

7. In an interval measuring device, a circuit having two normally non-conducting gaseous tubes with their anodes connected together, a connection between the cathodes of said tubes, one of said tubes becoming conducting at the beginning of the interval, the other tube becoming conducting at the end of the interval; a third electronic tube having its control element connected to the first circuit so that said third tube is conducting during the interval to be measured; a condenser in the plate-cathode circuit of the third tube; means connected to said third tube to maintain substantially constant current through said tube and the condenser while said tube is conducting; and means to measure the charge on the condenser.

8. In an interval measuring device, a circuit having two normally non-conducting gaseous tubes with their anodes connected together, a connection between the cathodes of said tubes, a common source of cathode-anode energy for the tubes connected between said anode and said cathode connections, an extinguishing resistance in the cathode circuit of one tube, said last mentioned tube becoming conducting at the beginning of the interval and non-conducting at the end of the interval when the other tube becomes conducting; a third electronic tube having its control element connected to the first circuit so that said third tube is conducting during the interval to be measured; a condenser in the plate-cathode circuit of the third tube; means connected to said third tube to maintain constant current through said tube and the condenser while said tube is conducting; and means to measure the charge on the condenser.

9. In an interval measuring device, a circuit responsive to a change in condition at the beginning and end of the interval to be measured including two normally non-conducting gaseous discharge tubes having anodes and cathodes, a connection between said anodes, a connection between said cathodes, a common source of energy for said tubes, an extinguishing resistance in series with the cathode of one tube, said last mentioned tube being rendered conducting at the beginning of the interval, said other tube being rendered conducting at the end of the interval whereby the first tube is again rendered non-conducting by the extinguishing resistance; a third electronic tube having an anode, cathode and at least one control element, at least one of said control elements being associated with the first tube and responsive to the flow of current therethrough; a condenser connected across the anode and cathode of said third tube; compensating resistance means to keep the charging current of said condenser constant; and means to measure the charge upon the condenser during the flow of current through the first tube.

10. In an interval measuring device having two normally non-conducting gaseous tubes with their anodes connected together, a connection between the cathodes of said tubes, one of said tubes becoming conducting at the beginning of the interval, the other tube becoming conducting at the end of the interval, an extinguishing resistance in the cathode circuit of the first tube, a source of energy connected between said cathode and said anode connection supplying operating energy for the anode-cathode circuits of the tubes, the first tube becoming non-conducting again as the second tube becomes conducting, a resistance in series between the source of energy and said anode connection; and a voltage operated indicator tube adapted to break down when the second tube only is conducting.

11. In an interval measuring device having two normally non-conducting gaseous tubes with their anodes connected together, a connection between the cathodes of said tubes, one of said tubes becoming conducting at the beginning of the interval, the other tube becoming conducting at the end of the interval, an extinguishing resistance in the cathode circuit of the first tube, a source of energy connected between said cathode and said anode connections supplying operating energy for the anode-cathode circuit of the tubes, the first tube becoming non-conducting again as the second tube becomes conducting, a resistance in series between the source of energy and said anode connection; and a voltage operated indicator tube connected between the anode of the second tube and the end of said second resistance adjacent the source of energy and adapted to break down when the second tube only is conducting.

12. In an interval timing apparatus having a circuit responsive to a change in condition at the beginning and end of the interval, a condenser and electronic tube connected with said circuit, said tube being rendered conducting during the interval to be measured, said condenser receiving charge when the tube is conducting; means to keep constant current flow through the tube and condenser while the tube is conducting; and means to measure the charge on the condenser, the condenser being so constructed as to have an absorption factor of less than 1.0% so as to give within 1.0% accuracy in the interval time determination.

COLIN IRVING BRADFORD.

CERTIFICATE OF CORRECTION.

Patent No. 2,301,195.                                           November 10, 1942.

COLIN IRVING BRADFORD.

It is hereby certified that error appears in the printed specification of the above numbered patent requiring correction as follows: Page 3, first column, line 19, for "15000" read --1500--; line 22, for "2" read --5--; line 33, for "Tyra" read --Thyra--; page 4, first column, line 6, for "17" read --77--; line 11, for "reading" read --readings--; page 7, second column, line 29, for "aid" read --said--; and that the said Letters Patent should be read with this correction therein that the same may conform to the record of the case in the Patent Office.

Signed and sealed this 30th day of March, A. D. 1943.

Henry Van Arsdale,
(Seal)                                    Acting Commissioner of Patents.

CERTIFICATE OF CORRECTION.

Patent No. 2,301,195. November 10, 1942.

COLIN IRVING BRADFORD.

It is hereby certified that error appears in the printed specification of the above numbered patent requiring correction as follows: Page 3, first column, line 19, for "15000" read --1500--; line 22, for "2" read --5--; line 33, for "Tyra" read --Thyra--; page 4, first column, line 6, for "17" read --77--; line 11, for "reading" read --readings--; page 7, second column, line 29, for "aid" read --said--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.